United States Patent [19]
Forster

[11] Patent Number: 5,918,529
[45] Date of Patent: Jul. 6, 1999

[54] HYDROSTATIC AXIAL PISTON MACHINE UTILIZING BRIDGE SEGMENTS WHICH ARE RADIALLY INWARD OF THE PISTON BORES

[75] Inventor: Franz Forster, Karlstadt-Mühlbach, Germany

[73] Assignee: Linde Aktiengesellschaft, Germany

[21] Appl. No.: 08/905,252

[22] Filed: Aug. 1, 1997

[30] Foreign Application Priority Data

Aug. 2, 1996 [DE] Germany ............................ 196 31 334
Oct. 11, 1996 [DE] Germany ............................ 196 42 021

[51] Int. Cl.[6] ............................................ F01B 3/00
[52] U.S. Cl. .................. 92/12.2; 92/57; 92/71; 91/505; 91/506; 417/269
[58] Field of Search ................. 92/12.2, 57, 71; 91/505, 506; 417/269

[56] References Cited

U.S. PATENT DOCUMENTS

| | | |
|---|---|---|
| 1,517,386 | 12/1924 | Almen . |
| 5,370,503 | 12/1994 | Terauchi . |
| 5,490,767 | 2/1996 | Kanou et al. . |
| 5,699,715 | 12/1997 | Forster . |
| 5,704,274 | 1/1998 | Forster . |

FOREIGN PATENT DOCUMENTS

| | | | |
|---|---|---|---|
| 415432 | 6/1925 | Germany . | |
| 3832132 | 3/1990 | Germany | .................................. 92/57 |
| 3832135 | 3/1990 | Germany | .................................. 92/57 |
| 82495 | 12/1919 | Switzerland | ............................. 92/12.2 |

*Primary Examiner*—Thomas E. Denion
*Attorney, Agent, or Firm*—Webb Ziesenheim Logsdon Orkin & Hanson, P.C.

[57] ABSTRACT

A hydrostatic axial piston machine with a swash plate achieves a high power with a compact and simple construction. Two cylinder drums are at some axial distance from one another and are in synchronous rotation. Each drum contains a group of concentric cylindrical borings, between which, and at an angle with respect to the axis of rotation of the axial piston machine there is a rotationally locked circular ring-shaped eccentric disc. The pistons are guided against the disc so that they can move longitudinally in the cylinder bores. Each piston consists of two piston segments having the same diameter oriented coaxially to one another and at some distance from one another. The segments are inserted in cylinder bores which are located opposite one another and are connected to one another by a bridge segment. Two support bodies, one on either side of the eccentric disc, are provided for movement on the eccentric disc along a track. The bridge segments are oriented radially inward toward the axis of rotation (D) of the axial piston machine.

18 Claims, 2 Drawing Sheets

HYDROSTATIC AXIAL PISTON MACHINE UTILIZING BRIDGE SEGMENTS WHICH ARE RADIALLY INWARD OF THE PISTON BORES

BACKGROUND OF THE INVENTION

The present invention relates to a hydrostatic axial piston machine utilizing a swash plate construction. Such machines are used in many variant constructions as pumps or engines.

The object of the present invention is to make available an axial piston machine of the type described above which, while compact and simple in terms of design, generates a high power output.

SUMMARY OF THE INVENTION

The above-described object can be accomplished if there are two cylinder drums positioned at some axial distance from one another and which are in synchronous rotation. Each cylinder drum contains a group of concentric cylindrical borings. Between the cylinder drums there is a rotation-locked circular eccentric disc, against which the pistons are guided so that they can move longitudinally in the cylinder bores. The pistons are used for the displacement of hydraulic medium or for pressurization by hydraulic medium on both piston ends. Each piston consists of two piston segments of the same diameter oriented coaxially to one another and at some distance from one another. The segments are inserted in cylinder bores located opposite one another and are connected to one another by a bridge segment. In each bridge segment there are two support bodies, one on either side of the eccentric disc. The support bodies are provided for direct or indirect movement on the eccentric disc along a track. The bridge segments are oriented radially inward toward the axis of rotation of the axial piston machine.

An important feature of the invention, in addition to the doubling of the cylinder chambers and thus of the effective piston segments, is the construction of the eccentric disc in the form of a circular ring-shaped disc and the orientation of the bridge segments of the pistons, into which the eccentric disc is inserted radially, specifically radially inward toward the axis of rotation.

The present design results in a very space-saving construction, and the axial piston machine configured according to the present invention has twice the displacement of the swash plate engines of the prior art, and thus double the power output.

Because the piston segments all have the same diameter, in connection with the coaxial arrangement of the two piston segments of a piston with diagonally opposite pressurization of two pistons located in a common plane, there is an equalization of forces in the axial direction.

The guided length of the pistons in the cylinder bores can be made significantly shorter than the length required for the same purpose in similar devices of the prior art. The guided length of the pistons are approximately 1.5 to 2.5 times the diameter of the piston. In particular, the guided length can be reduced to a dimension which is sufficient to seal the cylinder bores. This is because the transverse forces which act in the vicinity of the eccentric disc as a result of the interaction with the eccentric disc on the piston are not applied to the free ends of the piston. This is in contrast to the swash plate pumps of the prior art.

Consequently the dead stroke of the pistons is reduced. The dimension of the axial piston machine of the present invention in the axial direction is therefore very small in relation to the displacement. The construction of the invention makes possible significantly larger displacement angle of the eccentric disc than is the case in the prior art axial piston machines which employ the swash plate construction. This means in turn that the displacement can be increased further. Overall, therefore, a very large displacement can be achieved, which makes the axial piston machine of the invention suitable for use as a low-speed engine.

The axial piston machine of the invention does not require any special piston retraction device, like the one which is required in particular in swash plate machines of the prior art realized in the form of self-priming pumps. The special shape of the pistons in the vicinity of the bridge segments acts as a piston retraction device. The pistons therefore remain in constant active contact with the eccentric disc, i.e. even during the intake stroke. The piston retraction devices of the prior art, on the other hand, increase the amount of space occupied by the machine in the axial direction, and are complex, time-consuming and expensive to manufacture, assemble and install.

In another embodiment of the invention, the eccentric disc is mounted so that it can pivot, such that the displacement can be adjusted during operation. The invention thus makes possible an adjustable low-speed engine. On the contrary, low-speed engines of the prior art, which as a general rule are realized in the form of radial piston engines, cannot be adjusted. The axial piston engine of the invention, on account of its construction, also has a significantly higher limit speed of rotation than the low-speed engines of the prior art. It is possible to adjust the engine continuously through a rather broad speed range. The eccentric disc can advantageously be pivoted from an idle position, in which the eccentric disc is oriented perpendicular to the axis of rotation of the axial piston machine, toward two sides, so that a reversal is possible.

The pivoting capability of the eccentric disc is advantageously achieved because the eccentric disc is pivotally mounted by two journals which are coaxial to one another and are located on the outside periphery.

As a result of the construction geometry of the invention, there is a force component which undesirably attempts to rotate the piston around the center axis of the piston. It is advantageous to secure the piston to prevent rotation around the center axis of the piston. For this purpose it is favorable if the bridge segments of the piston are provided with guide segments which act in the peripheral direction and which are constructed to come into contact with corresponding guide segments of the bridge segments of the neighboring pistons.

Each of the pistons is therefore supported on the neighboring piston. For the piston segments which are located on the one side of the eccentric disc and are under high pressure, the result is a direction of rotation which is opposite to the direction of rotation of the piston segments which are located on the opposite side of the eccentric disc offset by 180 degrees, and which are also under high pressure. The rotational forces are therefore directed opposite to one another, and consequently neutralize one another. Therefore, no special support with respect to the cylinder drums is necessary.

Between the bridge segments of the pistons which are next to one another there is also only a low relative velocity in operation. This is caused by the advance, or delay, of the movement of the neighboring piston, so that the rotational lock has a high resistance to wear.

To facilitate the assembly and installation of the pistons, the bridge segment of at least one piston has lateral segments. The distance of the lateral segments from a hypothetical line which runs between the center axis of the piston and the axis of rotation of the axial piston machine, starting from the guide segments and proceeding toward the center axis of the piston, is either constant or decreases.

In one configuration of the invention, there is a machine shaft which is realized in one piece with one of the two cylinder drums. The other cylinder drum is detachably fastened to the machine shaft. This construction lowers the total number of parts and simplifies assembly. In this sense, it is also appropriate to provide a one-piece machine housing.

To introduce a rotational movement to generate a hydraulic current or to tap a rotational movement, the machine shaft and/or the cylinder drums formed in one piece with the machine shaft are provided with means for the transmission of torque.

In one refinement of the invention, the axial piston machine is in the form of a wheel engine. As a result of the large displacement of the axial piston machine of the invention, it can be used as a low-speed engine, which can be used for direct propulsion purposes. Therefore there is no need for the transmissions which are required to reduce the speed of rotation of the high-speed axial piston engines which are used to propel a wheel in systems of the prior art. With regard to prior art wheel engines in the form of slow-speed radial piston engines without a downstream transmission, the axial piston machine of the invention, on account of its design with piston segments guided on both sides, when used as a wheel engine, has a significantly higher limit speed of rotation. Such a machine is therefore capable of rotating significantly faster than a radial piston engine. Vehicles which are propelled with the axial piston engine of the invention used as a wheel engine can therefore be operated continuously over a broader range of speeds.

In terms of assembly and installation engineering, it is favorable for such a wheel propulsion system if the cylinder drum which is formed in one piece with the machine shaft has a centering device which acts as a receptacle for at least one wheel rim, and which is provided with threaded borings to hold the wheel rim.

In an additional advantageous configuration of the invention, the bearing system of the machine shaft is realized in the form of a wheel bearing system. The bearing system of the machine shaft and the wheel bearing system are therefore combined, which further reduces the number of parts required. If the bearing system has two oblique roller bearings, in particular tapered roller bearings, large wheel loads and propulsion forces can be absorbed.

With regard to the control of the axial piston machine of the invention, the eccentric disc is provided with a control surface in the vicinity of both of the support bodies which are located one on each side. Located in the control surfaces are kidney-shaped control slots which are connected to supply channels and are provided for the periodic connection of the cylinder bores to the supply channels. Connecting channels to the cylinder bores are provided in the piston segments and in the support bodies. As a result of this arrangement, a constructively simple and operationally reliable control system is created with minimum expense and effort. An additional result is a control surface which is easy to manufacture.

The supply channels advantageously empty into two coaxial journals of the eccentric disc which act as bearings for the eccentric disc, and located coaxial to one another on the outside periphery. This arrangement makes possible a simple supply and discharge of the hydraulic medium.

A ring-shaped disc is advantageously located between the support bodies and the control surface which interacts with them. The ring-shaped disc is fixed in position to prevent rotation relative to the pistons and/or the support bodies, and is provided with borings which correspond to the connecting channels in the support bodies. The control surface is therefore not in direct contact with the support bodies. The rotating ring-shaped disc covers the control slots, and makes the feed to the cylinder bores possible by means of the machined borings.

There is appropriately a rotation lock for the ring-shaped discs in the bridge segment of at least one piston.

It is particulary appropriate if the support bodies are in the form of segments of spheres. The support bodies in the form of sphere segments represent low-mass components which generate significantly reduced centrifugal forces acting on the cylinder drums. An additional advantage is an improved starting action.

The overall length of the axial piston machine of the invention is also significantly shorter in this area than propulsion engines of the prior art, because the support of the piston by a support body in the form of a segment of a sphere occupies very little space in the axial direction compared to the support by a ball-and-socket joint and a guide shoe like those used in similar devices of the prior art.

If the centers of the spheres which correspond to the sphere segments are located on the center axis of the two piston segments, favorable conditions result with regard to a splitting of the piston force.

Additional advantages and details of the invention are explained in greater detail below with reference to the embodiment which is illustrated schematically in the accompanying figures.

Figure 1:
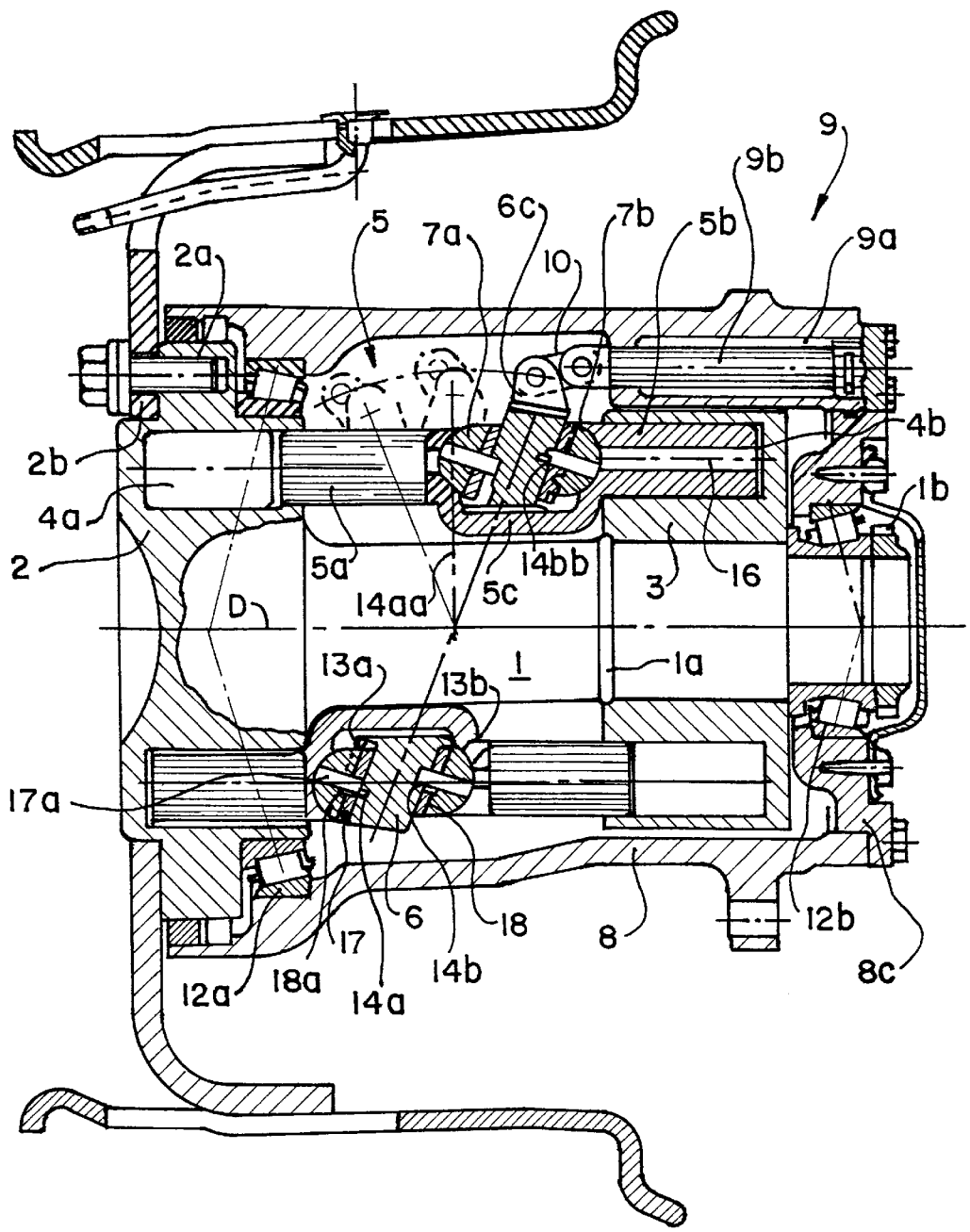
FIG. 1 is a longitudinal section through an axial piston machine according to the invention.
Figure 2:
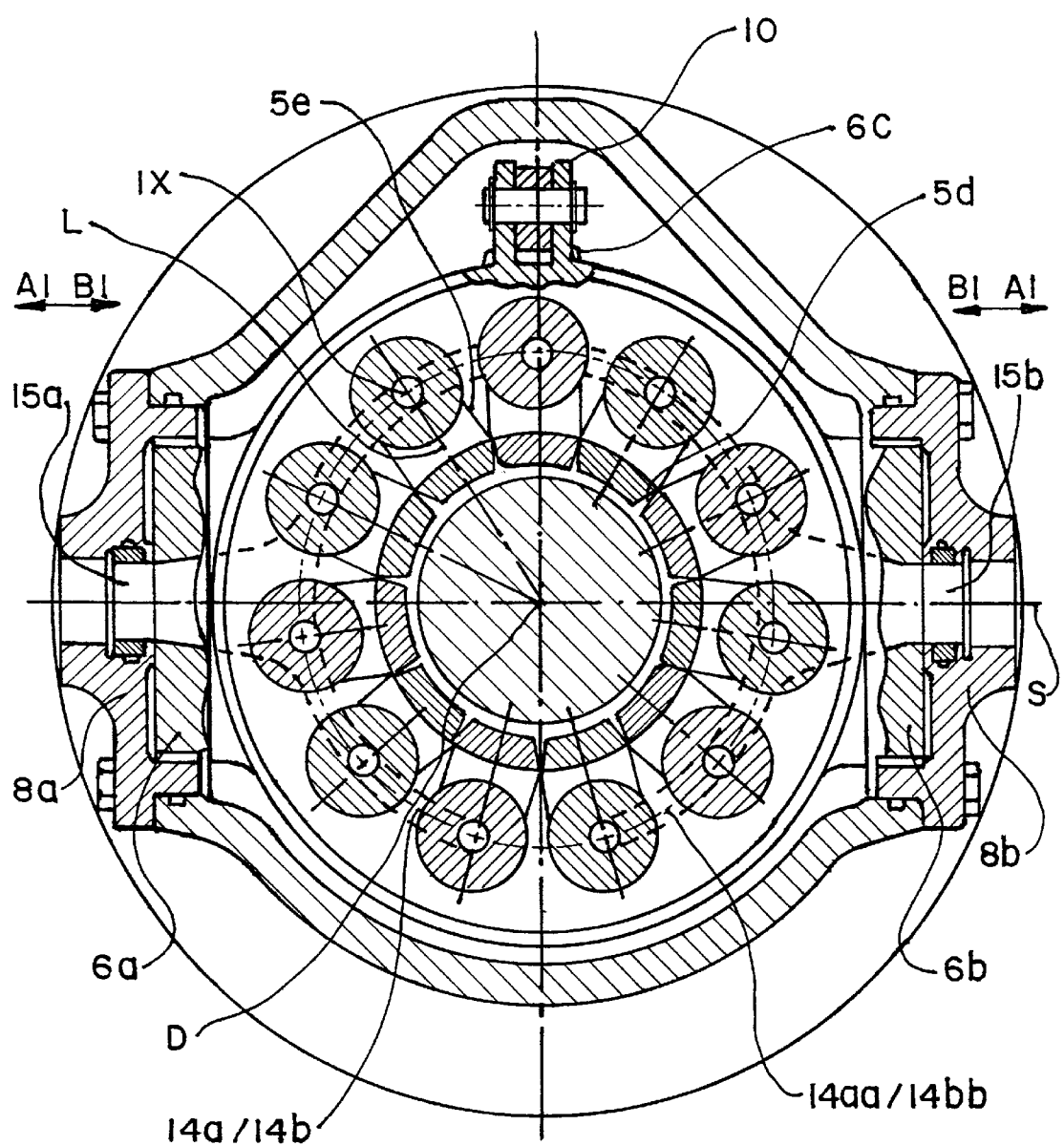
FIG. 2 is a cross section through the axial piston machine illustrated in FIG. 1.

The axial piston machine illustrated in FIGS. 1 and 2 utilizes the swash plate construction and is used as a wheel engine for a closed circuit, and as a result of the adjustability of its displacement in both directions (i.e. reversibility), is suitable for use in four-quadrant operation.

A first cylinder drum 2 is formed integrally with a machine shaft 1 and in FIG. 1 is located on the left end of the machine shaft 1. A second cylinder drum 3 located on the right end of the machine shaft 1 at some axial distance from the first cylinder drum 2 and is non-rotationally connected to the machine shaft 1 by splining or by another suitable means.

The second cylinder drum 3 is secured to the shaft 1 to prevent axial displacement on the machine shaft 1 by a shaft collar 1a and a shaft nut 1b.

Each of the two cylinder drums 2 and 3 has concentric cylinder bores 4a, 4b. The cylinder bores 4a, 4b which are opposite one another in the two cylinder drums 2 and 3 are each located in coaxial pairs, and have the same diameter.

Guided so that they can move longitudinally in the cylinder bores 4a and 4b are pistons 5, which are formed so that they can be pressurized with hydraulic fluid on both ends of the piston. Each of the pistons 5 consists of two piston segments 5a, 5b at some axial distance from one another having the same diameter and oriented coaxial to one another.

The piston segment 5a is inserted into a cylinder bore 4a of the first cylinder drum 2. The piston segment 5b is inserted into a cylinder bore 4b of the second cylinder drum 3. The two cylinder bores 4a and 4b, each of which correspond to a piston 5, thereby lie opposite one another. The two piston segments 5a and 5b are connected to one another by a bridge segment 5c.

Between the cylinder drums 2 and 3, at an inclination to the axis of rotation D of the axial piston machine, there is a ring-shaped eccentric disc 6 which is installed so that it does not rotate, and which is effectively connected to each piston 5. In this case, two support bodies 7a and 7b are located one on each side of the eccentric disc 6 in each bridge segment 5c of each piston 5.

In this embodiment, the support bodies 7a, 7b are formed as segments of a sphere and slide along a track on the eccentric disc 6, but not directly, as will be explained in further detail below. The centers of the spheres corresponding to the sphere segments are located on the center axis of the two piston segments 5a, 5b.

The bridge segments 5c of the pistons 5 are each oriented radially inward toward the axis of rotation D of the axial piston machine, so that there is the smallest possible distance between the bridge segments 5c and the axis of rotation D.

The eccentric disc is able to pivot around a pivoting axis S, as a result of which the displacement of the axial piston machine of the invention can be adjusted during operation between two maximum values with opposite signs, and thus the propulsion mechanism can be reversed.

As shown in FIG. 2, the pivoting action of the eccentric disc 6 is made possible by two journals 6a and 6b which are coaxial to one another and are located on the outside periphery of the eccentric disc 6, which journals are each mounted in a screwed-on bearing cover 8a and 8b respectively of a preferably one-piece machine housing 8.

The eccentric disc 6 is adjusted by means of a servo cylinder/servo piston unit 9, the servo cylinder 9a of which, in this embodiment, is machined into the machine housing 8, and the servo piston 9b of which is connected by means of an intermediate rod 10 in an articulated manner with an extension 6c of the eccentric disc 6 (See FIG. 1).

The bridge segments 5c of the pistons 5 are provided with guide segments 5d which act in the peripheral direction, and which are in contact with corresponding guide segments 5d of the bridge segments 5c of the neighboring pistons 5. The pistons 5 are thus protected to prevent their rotation around the center axis of the piston.

The geometric force component which undesirably attempts to rotate each of the pistons 5 around the center axis of its piston is thereby neutralized because the pistons 5 are each supported on the neighboring piston 5. For the piston segments which are located on the one side of the eccentric disc and are under high pressure, that results in a direction of rotation which is opposite to the direction of rotation of the piston segments which are located on the opposite side of the eccentric disc, offset by 180 degrees, and are also under high pressure. The rotational forces therefore act in opposite directions to one another and consequently neutralize one another, so that no special support with respect to the cylinder drums 2, 3 is necessary.

During operation, there is only a small relative velocity between the bridge segments 5c of the pistons 5 which are next to one another, which relative velocity is caused by the advance or delayed movement of the pistons 5 which are located next to one another, which means that the rotation lock has a high resistance to wear.

To make possible an installation of the pistons 5, the bridge segment 5c of at least one piston 5 has lateral segments 5e. The distance of each lateral segment 5e from a hypothetical line L which runs between the center axis K of the piston and the axis of rotation D of the axial piston machine, starting from the guide segments 5d and continuing toward the center axis K of the piston, is constant or decreases. In the illustrated embodiment, all the pistons 5 have the same shape.

With regard to the propulsion forces which are active in the axial direction, when there is a diagonally opposite pressurization of two pistons 5 located in a common plane, there is an equalization of forces, because the piston segments 5a, 5b of all the pistons 5 have the same diameter.

The cylinder drum 2 which is formed in one piece with the machine shaft 1 is provided with means for the transmission of torque. The torque transmission mechanism is formed by threaded borings 2a for the fastening of one or more wheel rims. The cylinder drum 2 also has a centering device 2b which is used as a receptacle for at least one wheel rim.

The machine shaft 1 is mounted by two oblique roller bearings 12a and 12b, in particular tapered roller bearings, in the machine housing 8. This heavy duty bearing system simultaneously functions as the wheel bearing. The oblique roller bearing 12a on the left in the figure is located between the first cylinder drum 2 and the machine housing 8. The oblique roller bearing 12b on the right of the figure is located between the machine shaft 1 and a bearing cover 8c which closes the machine housing 8.

To control the axial piston machine configured according to the invention, the eccentric disc 6 is provided in the vicinity of each of the support bodies 7a, 7b, one on each side, with respective control surfaces 13a, 13b in which there are kidney-shaped control slots 14a, 14aa, 14b, 14bb, which are connected to supply channels 15a, 15b. The control slots 14a and 14bb which are diagonally opposite one another on the eccentric disc 6 are thereby connected to one of the supply channels 15a, and the control slots 14b, 14aa which are diagonally opposite one another are connected to the other supply channel 15b.

For the periodic establishment of a connection between the cylinder bores 4a, 4b and the supply channels 15a, 15b, connecting channels 16 which lead to the cylinder bores 4a, 4b are located in the piston segments 5a, 5b and in the support bodies 7a, 7b.

The supply channels 15a, 15b empty into the journals 6a, 6b of the eccentric disc 6 which are located on the outside periphery, and which are used to mount the eccentric disc 6 in the machine housing 8. In this case, the individual supply channels 15a, 15b empty into respective journals 6a, 6b.

Between the support bodies 7a and the control surface 13a which interacts with them there is a ring-shaped disc 17 which is fixed in position to prevent rotation relative to the pistons 5 and/or the support bodies 7a, and is provided with borings 17a which correspond to the connecting channels 16 in the support bodies 7a.

In an analogous manner, between the support bodies 7b and the control surface 13b which interacts with them there is a ring-shaped disc 18 which is fixed in position to prevent rotation relative to the pistons 5 and/or the support bodies 7b, which ring-shaped disc is provided with borings 18a which correspond to the connecting channels 16 in the support bodies 7b.

I claim:

1. A hydrostatic axial piston machine utilizing a swash plate construction said piston machine comprising:

two cylinder drums axially spaced from each other and in synchronous rotation, each said cylinder drum comprising a group of concentric cylindrical bores;

a circular ring-shaped eccentric disc non-rotatably mounted in said piston machine between said cylinder drums; and pistons guided against said disc for longitudinal movement within said cylindrical bores for the displacement of hydraulic medium or for pressurization by hydraulic medium on both piston ends, each said piston including two piston segments having the same diameter orientated coaxially at a distance from each other, said piston segments inserted oppositely positioned ones of said cylindrical bores, and each said piston including a bridge segment connecting said two piston segments, and said piston including two support bodies positioned on opposite sides of said eccentric disc, said support bodies provided for movement relative to said disc, and wherein said bridge segments are orientated radially inward relative to said concentric cylindrical bores toward the axis of rotation of the axial piston machine.

2. The hydrostatic axial piston machine as claimed in claim 1, further including a one-piece machine housing.

3. The hydrostatic axial piston machine as claimed in claim 1, wherein said support bodies are segments of a sphere.

4. The hydrostatic axial piston machine as claimed by claim 3, wherein centers of spheres which correspond to said sphere segments are located on a center axis of said two piston segments.

5. A hydrostatic axial piston machine utilizing a swash plate construction, said piston machine comprising:

two cylinder drums axially spaced from each other and in synchronous rotation, each said cylinder drum comprising a group of concentric cylindrical bores;

a circular ring-shaped eccentric disc non-rotatably mounted in said piston machine between said cylinder drums, wherein said eccentric disc is mounted so that it can pivot; and pistons guided against said disc for longitudinal movement within said cylindrical bores, each said piston including two piston segments having the same diameter orientated coaxially at a distance from each other, said piston segments inserted oppositely positioned ones of said cylindrical bores, and each said piston including a bridge segment connecting said two piston segments, and said piston including two support bodies positioned on opposite sides of said eccentric disc, said support bodies provided for movement relative to said disc, and wherein said bridge segments are orientated radially inward relative to said concentric cylindrical bores toward the axis of rotation of the axial piston machine.

6. The hydrostatic axial piston machine as claimed in claim 5, wherein said eccentric disc is pivotally mounted by two coaxial journals located on an outside periphery of said disc.

7. A hydrostatic axial piston machine utilizing a swash plate construction, said piston machine comprising:

two cylinder drums axially spaced from each other and in synchronous rotation, each said cylinder drum comprising a group of concentric cylindrical bores;

a circular ring-shaped eccentric disc non-rotatably mounted in said piston machine between said cylinder drums; and pistons guided against said disc for longitudinal movement within said cylindrical bores, each said piston including two piston segments having the same diameter orientated coaxially at a distance from each other, said piston segments inserted oppositely positioned ones of said cylindrical bores, and each said piston including a bridge segment connecting said two piston segments, and said piston including two support bodies positioned on opposite sides of said eccentric disc, said support bodies provided for movement relative to said disc, and wherein said bridge segments are orientated radially inward relative to said concentric cylindrical bores toward the axis of rotation of the axial piston machine, wherein said bridge segments of said pistons are provided with guide segments which are active in the peripheral direction, and which come into contact with corresponding guide segments of bridge segments of adjacent pistons.

8. The hydrostatic axial piston machine as claimed in claim 7, the bridge segment of at least one piston has lateral segments, wherein a distance from said lateral segments to a hypothetical line which runs between the center axis of the piston and the axis of rotation of the axial piston machine, starting from the guide segments and continuing toward the center axis of the piston, is not increasing.

9. A hydrostatic axial piston machine utilizing a swash plate construction, said piston machine comprising:

two cylinder drums axially spaced from each other and in synchronous rotation, each said cylinder drum comprising a group of concentric cylindrical bores;

a circular ring-shaped eccentric disc non-rotatably mounted in said piston machine between said cylinder drums; and pistons guided against said disc for longitudinal movement within said cylindrical bores, each said piston including two piston segments having the same diameter orientated coaxially at a distance from each other, said piston segments inserted oppositely positioned ones of said cylindrical bores, and each said piston including a bridge segment connecting said two piston segments, and said piston including two support bodies positioned on opposite sides of said eccentric disc, said support bodies provided for movement relative to said disc, and wherein said bridge segments are orientated radially inward relative to said concentric cylindrical bores toward the axis of rotation of the axial piston machine, and further including a machine shaft which is integrally formed with one of the said two cylinder drums, wherein the other of said cylinder drums is detachably connected to said machine shaft.

10. The hydrostatic axial piston machine as claimed in claim 9, wherein said machine shaft and said integral cylinder drum are provided with a means for the transmission of torque.

11. The hydrostatic axial piston machine as claimed in claim 10, wherein said axial piston machine is a wheel engine.

12. The hydrostatic axial piston machine as claimed in claim 11, wherein said machine shaft and integral cylinder drum has a centering device which locates at least once wheel rim, and which is provided with threaded borings for fastening said wheel rim.

13. The hydrostatic axial piston machine as claimed in claim 11, wherein a bearing system of said machine shaft is a wheel bearing system.

14. The hydrostatic axial piston machine as claimed in claim 13, wherein said bearing system has two oblique roller bearings.

15. A hydrostatic axial piston machine utilizing a swash plate construction, said piston machine comprising:

two cylinder drums axially spaced from each other and in synchronous rotation, each said cylinder drum comprising a group of concentric cylindrical bores;

a circular ring-shaped eccentric disc non-rotatably mounted in said piston machine between said cylinder drums; and pistons guided against said disc for longitudinal movement within said cylindrical bores, each said piston including two piston segments having the same diameter orientated coaxially at a distance from each other, said piston segments inserted oppositely positioned ones of said cylindrical bores, and each said piston including a bridge segment connecting said two piston segments, and said piston including two support bodies positioned on opposite sides of said eccentric disc, said support bodies provided for movement relative to said disc, and wherein said bridge segments are orientated radially inward relative to said concentric cylindrical bores toward the axis of rotation of the axial piston machine, and wherein said eccentric disc is provided with one control surface on each side adjacent said support bodies, wherein said control surfaces include control slots which are connected to supply channels and are provided for the periodic connection of said cylinder bores with said supply channels, and wherein connecting channels to said cylinder bores are located in said piston segments and in said support bodies.

16. The hydrostatic axial piston machine as claimed in claim 15, wherein said supply channels empty into two journals of said eccentric disc, which said journals are located on an outside periphery of said disc and are coaxial to one another, and said eccentric disc is pivotally mounted by said journals.

17. The hydrostatic axial piston machine as claimed in claim 15, wherein between each said support body and said control surface is a ring-shaped disc which is fixed in position to prevent rotation relative to said pistons and is provided with borings which correspond to said connecting channels in said support bodies.

18. The hydrostatic axial piston machine as claimed in claim 17, wherein in said bridge segment of at least one piston there is a rotational lock for said ring-shaped discs.

* * * * *

UNITED STATES PATENT AND TRADEMARK OFFICE
CERTIFICATE OF CORRECTION

PATENT NO.  : 5,918,529
DATED       : July 6, 1999
INVENTOR(S) : Franz Forster

It is certified that error appears in the above-identified patent and that said Letters Patent is hereby corrected as shown below:

Column 4 Line 56 "collar 1a" should read --collar 1a--.

Claim 1 Column 6 Line 67 after "construction" insert --,--.

Claim 12 Column 8 Line 57 "at least once" should read --at least one--.

Signed and Sealed this

Fourth Day of January, 2000

Attest:

Attesting Officer

*Acting Commissioner of Patents and Trademarks*